(12) United States Patent
Mason

(10) Patent No.: US 10,799,030 B2
(45) Date of Patent: Oct. 13, 2020

(54) SUPPORT ELEMENT AND METHOD FOR ITS REALISATION

(71) Applicant: TECHNOGEL ITALIA S.R.L., Pozzoleone (IT)

(72) Inventor: Matteo Mason, Limena (IT)

(73) Assignee: TECHNOGEL ITALIA S.R.L., Pozzoleone (VI) (IT)

( * ) Notice: Subject to any disclaimer, the term of this patent is extended or adjusted under 35 U.S.C. 154(b) by 652 days.

(21) Appl. No.: 15/640,876

(22) Filed: Jul. 3, 2017

(65) Prior Publication Data

US 2017/0295946 A1 Oct. 19, 2017

Related U.S. Application Data

(62) Division of application No. 14/359,723, filed as application No. PCT/IB2012/056592 on Nov. 21, 2012, now Pat. No. 9,737,152.

(30) Foreign Application Priority Data

Nov. 21, 2011 (IT) .............................. VR2011A0206

(51) Int. Cl.
*A47C 21/04* (2006.01)
*A47C 27/14* (2006.01)
(Continued)

(52) U.S. Cl.
CPC .......... *A47C 21/046* (2013.01); *A47C 27/085* (2013.01); *A47C 27/144* (2013.01);
(Continued)

(58) Field of Classification Search
CPC ...... A47G 9/10; A61G 5/1043; B29C 44/065; B29C 44/08; B29C 37/0032; B29C 2037/0035; B29C 70/026; B29C 70/603; B29C 44/0476; B29C 44/186; B29C 39/00; B29C 39/021; B29C 39/10; B29C 39/142; B29C 39/18; B29C 39/206; A47C 21/046; A47C 27/085; A47C 27/144; A47C 27/146; A47C 27/15
See application file for complete search history.

(56) References Cited

U.S. PATENT DOCUMENTS 6,739,008 B1 5/2004 Kindrick
7,576,137 B2 8/2009 Gansen et al.
(Continued)

OTHER PUBLICATIONS

International Search Report dated Apr. 3, 2013 for International Application No. PCT/IB2012/056592.

*Primary Examiner* — Stella K Yi
(74) *Attorney, Agent, or Firm* — Tutunjian & Bitetto, P.C.

(57) ABSTRACT

A support element, for example a plate, a mattress, a pillow, a seating plane of a chair, of an armchair, a saddle for vehicles and the like, equipped with a resting surface for a user, includes at least one first layer in gel associated with at least one second layer of different material; such a first layer in gel and such a second layer, that are associated, are crossed by through openings that are suitable for the proper circulation of air from one side to the other of the support element, so as to allow the optimal transpiration and thermal regulation of the parts of the body of the user positioned resting on the support element itself.

6 Claims, 5 Drawing Sheets

(51) Int. Cl.
  *A47C 27/08* (2006.01)
  *A47C 27/15* (2006.01)
  *A47G 9/10* (2006.01)
  *A61G 5/10* (2006.01)
  *B29C 44/06* (2006.01)
  *B29L 9/00* (2006.01)

(52) U.S. Cl.
  CPC ............ *A47C 27/146* (2013.01); *A47C 27/15* (2013.01); *A47G 9/10* (2013.01); *A61G 5/1043* (2013.01); *B29C 44/06* (2013.01); *A47G 2009/1018* (2013.01); *B29L 2009/00* (2013.01)

(56) References Cited

U.S. PATENT DOCUMENTS

| | | |
|---|---|---|
| 7,625,629 B2 | 12/2009 | Takaoka |
| 2004/0211005 A1 | 10/2004 | Kuo |
| 2005/0017396 A1 | 1/2005 | Pearce et al. |
| 2007/0226911 A1 | 10/2007 | Gladney et al. |
| 2007/0261274 A1* | 11/2007 | Fox .................... A43B 1/0072 36/154 |
| 2011/0154576 A1 | 6/2011 | Warren et al. |
| 2011/0258782 A1 | 10/2011 | Call |

* cited by examiner

SUPPORT ELEMENT AND METHOD FOR ITS REALISATION

CROSS-REFERENCE TO RELATED APPLICATIONS

This application is a divisional of co-pending application Ser. No. 14/359,723 filed May 21, 2014, the disclosure of which is incorporated herein by reference.

TECHNICAL FIELD OF THE INVENTION

The present invention concerns a support element for supporting the body of a person or parts thereof, such as for example a plate, a mattress, a pillow, a seating plane of a chair, of an armchair, a saddle for vehicles and the like, and the method for making it.

STATE OF THE ART

Elements for supporting the body of a person or parts of it, such as plates, mattresses, pillows, seating planes of chairs and armchairs, saddles for vehicles and the like, are known, which in order to ensure comfort to the user are made from layers of different materials, and in particular comprise at least one layer of foam to which an upper gel layer is associated; using gel is widely used due to its mechanical characteristics, which make it possible for there to be suitable comfort through the support and the three-dimensional distribution of the weight of the user.

In the rest of the description, by the term three-dimensional distribution of weight we mean the capability of a material of supporting the user by receiving him with an increased contact surface.

The greater contact surface between the material and the user is mainly due to the capability of the material to move in the three directions of the Cartesian axes.

Such a capability of some materials is essentially due to the intrinsic physical characteristics of the material itself.

Indeed, when one of such materials is compressed in one direction, it expands in the other two directions perpendicular to the compression direction, according to the well known Poisson effect and according to the Poisson coefficient of the material itself.

Therefore the weight of the user that acts for example in the vertical direction is absorbed by the material without a substantial increase of the contact pressure between the material and the user and the portion of material which has moved according to the vertical direction for receiving the user is transferred to the other two directions perpendicular to the vertical direction.

Known types of mattresses, and similar support elements, are in fact made up of an upper layer made from gel that is associated with a layer made from foam, which can both be coupled with a base, for example again made from foam or a spring base; moreover, it can be foreseen for there to be an outer protection cover.

Mattresses of this type have the required mechanical characteristics of elasticity and cushioning, and can adapt well to the body of a person or to parts of it. However they have some drawbacks due to the fact that a continuous layer made from gel, since it is a compact and soft material, which exactly follows the shape of the body of the user, does not allow air to circulate in the mattress, actually preventing a suitable transpiration of the parts of the body in contact with the support element, at the expense of the comfort of the user himself.

In order to avoid such a problem other known types of mattresses, and similar support elements have been devised of the modular type, or turret-shaped or with similar geometrical shapes, i.e. mattresses made up of a plurality of single modular elements comprising portions that are made from different materials, and in particular an upper portion made from gel that is associated with at least one portion made from foam: such modular elements are coupled together through suitable anchoring means so as to define gaps that are suitable for allowing air to pass through them.

However, even such known types of mattresses have drawbacks, due to the fact that in some cases the modular elements may become squashed together, for example also due to the simple pressure exerted by the person lying on the mattress, also in this case not allowing a suitable circulation of air, despite there being a discontinuity in the contact; and in any case the operations of making and assembling the modular elements with one another or with a foreseen base, are laborious and require particular attention of the workers, and the time for making them are consequently long, with obvious drawbacks also in terms of cost.

Other solutions, like for example that illustrated in patent application US2005/0017396, have a padding in which elastomers with through openings crossing the padding itself, are used, forming for example a honeycomb structure.

In this case, the geometrical structure of the padding near to the user is intended to deform and to become unstable and thus yield. The geometrical structures of patent application US2005/0017396 do not therefore have a three-dimensional deformation in the previously mentioned direction.

Moreover, the geometrical structures of patent application US2005/0017396 have a contact surface with the user that is less than or equal to 50% of the entire surface and this factor determines a contact pressure that is even greater than that of a continuous structure.

Therefore the geometrical structures of patent application US2005/0017396, if on one hand they can offer sufficient ventilation, on the other hand, also due to the need of having a geometrical honeycomb-like shape or the like, they do not offer sufficient comfort.

On the other hand, in gel paddings the softness is intrinsic to the material according to the aforementioned three-dimensional deformation.

Moreover, in gel paddings the contact surface with the user can be made in a desired manner and therefore greater than that illustrated in US2005/0017396, making it possible to further decrease the contact pressure.

Another known type of support element is that described in document US2004/211005.

The support element described in US2004/211005 comprises one or more bases made from synthetic and/or fibrous material, equipped with ventilation perforations.

On such a base it is foreseen for there to be an absorption layer of material of the gel type, which is in turn completely covered by a film of non-stick material that is applied through spraying of the surfaces of the mould that forms the gel layer.

The presence of such a film made from non-stick material, actually, prevents the circulation of air from one side to the other of the support element, depriving the element itself of the important function of transpiration and thermal regulation of the parts of the body resting on it.

SUMMARY OF THE INVENTION

The technical task of the present invention is therefore that of devising a support element and a method for making it, which in addition to having characteristics of elasticity, cushioning and adaptability, also allows the optimal circulation of air inside it, ensuring the suitable transpiration and thermal regulation of the parts of the body resting on it, thus ensuring maximum comfort of the user.

In such a technical task, one particular purpose of the present invention is to devise a method for making the support element that is simple and fast, so as to cut down time and relative production costs.

This purpose is achieved with the support element and method for making it according to the present principles.

The support element, for example a plate, a mattress, a pillow, a seating plane of a chair, of an armchair, a saddle for vehicles and the like, equipped with a resting surface for a user comprises at least one first layer made from gel that is associated with at least one second layer made from different material; such a first layer made from gel and such a second associated layer are crossed by through openings that are suitable for the proper circulation of air, so as to allow the optimal transpiration and thermal regulation of the parts of the body of the user positioned resting on the support element itself.

Further advantageous characteristics are described in the dependent claims.

BRIEF DESCRIPTION OF THE DRAWINGS

The characteristics of the invention shall become clearer to a man skilled in the art from the following description and from the attached drawing tables, given as an example and not for limiting purposes, in which.

DETAILED DESCRIPTION

Figure 1:
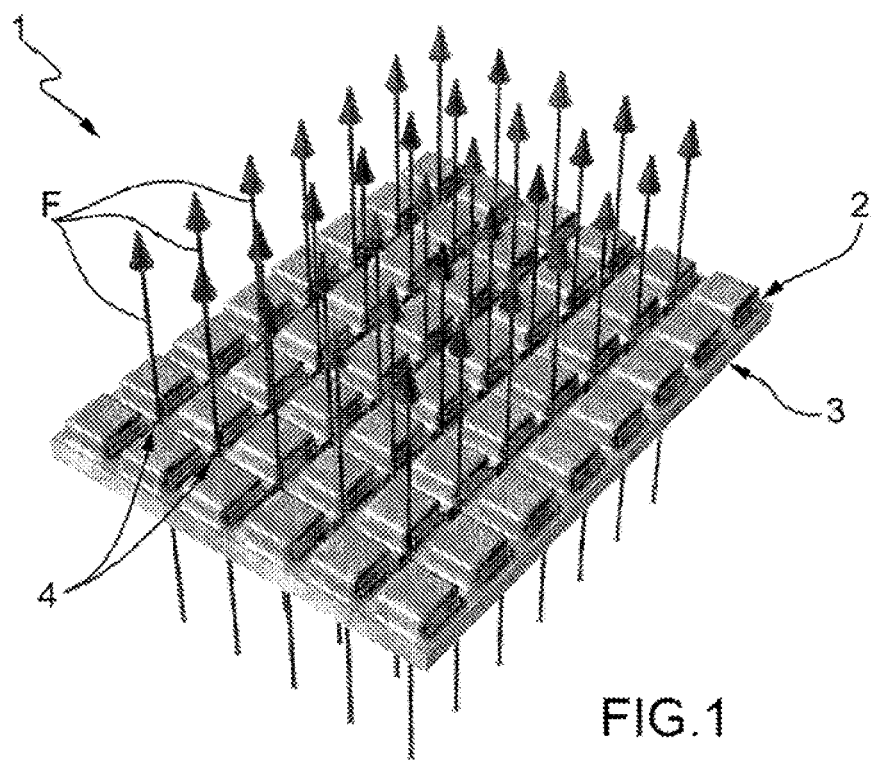
FIGS. 1 and 2 are two schematic perspective views of the support element according to the present invention in which the air passages are highlighted.

With reference to the attached figures, reference numeral 1 wholly indicates a support element according to the present invention.

The support element 1 according to the present invention can be in the form, for example, of a plate, a mattress, a pillow, a seating plane of a chair, of an armchair, a saddle for vehicles and the like.

In the case in which it is in the form of a plate, the support element 1 according to the present invention can be used on top of other support elements of the aforementioned type, for example mattresses, pillows, seating planes, etcetera.

Figure 2:
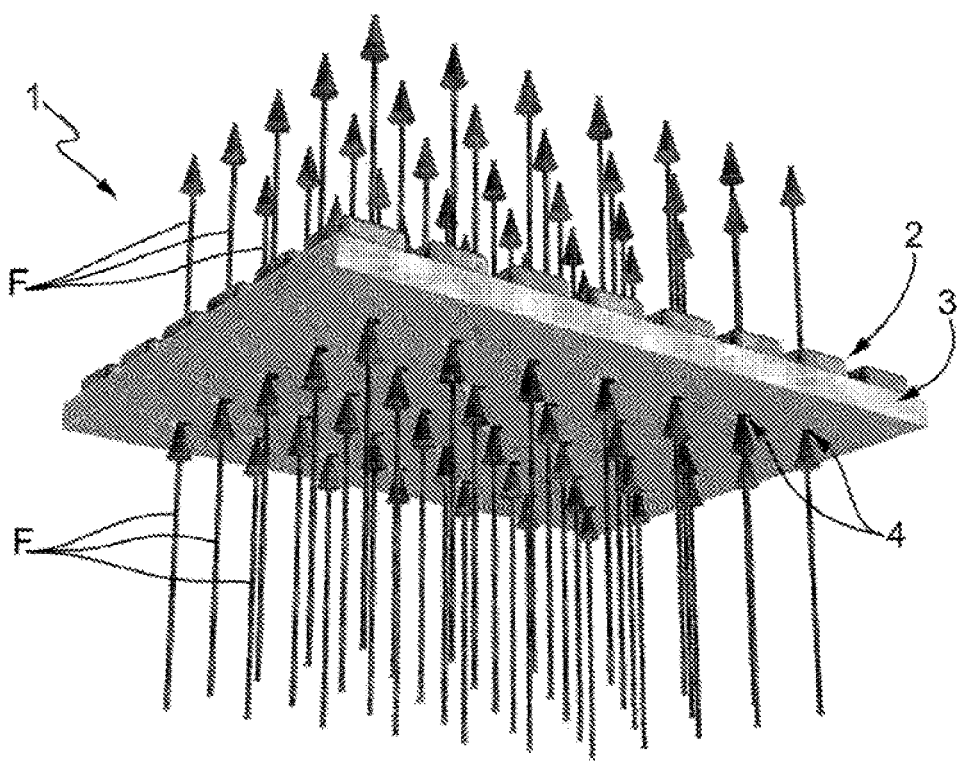
Figure 3:
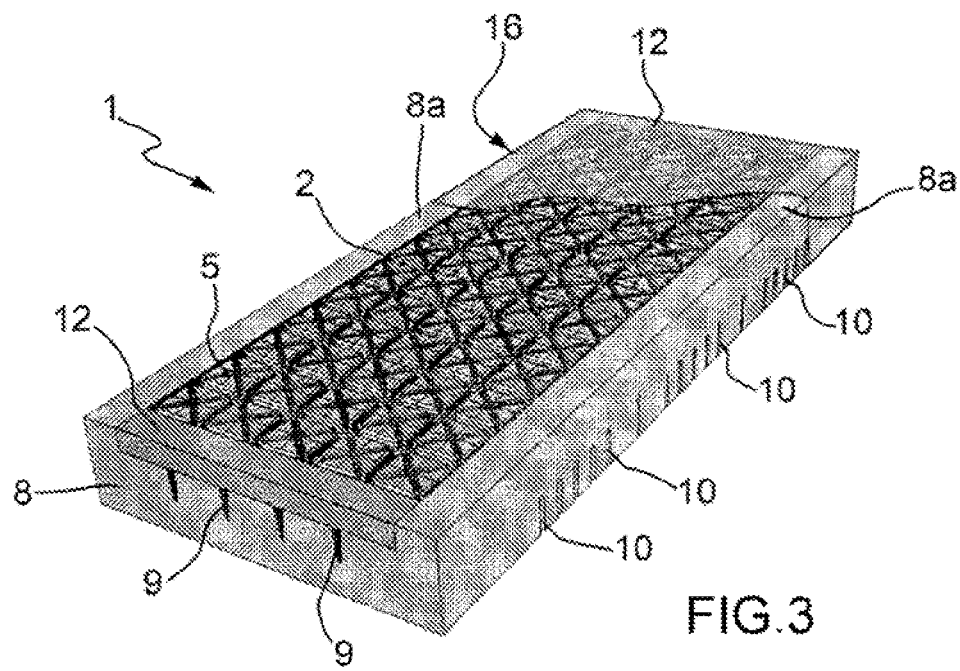
FIG. 3 is a perspective view of a support element according to one version of the present invention used for a mattress.
Figure 4:
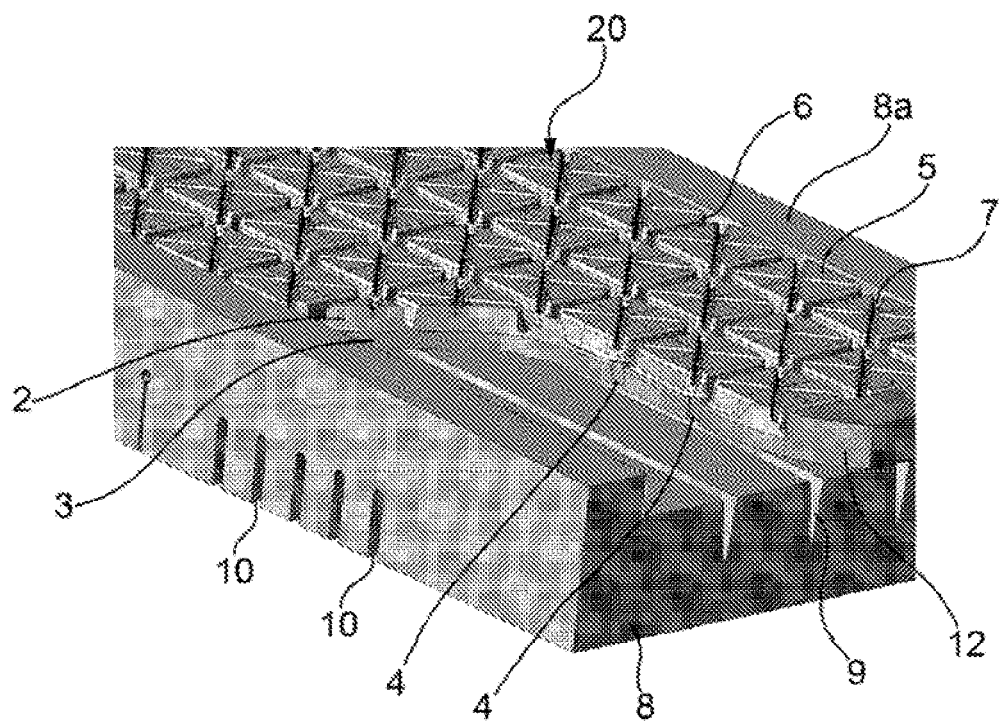
FIG. 4 is a partially cut-out perspective view of a detail of the support element, according to the version of the previous figure.

In the most simple version, the support element 1 is equipped with a resting surface for a user and comprises at least one first layer 2 made from gel associated with at least one second layer 3 made from a different material; such a first layer 2 made from gel and such a second associated layer 3 are passed through by through openings 4 that are suitable for the proper circulation of air from one side of the support element 1 to the other, as illustrated in FIGS. 1, 2, so as to allow the optimal transpiration and thermal regulation of the parts of body of the user positioned resting on the support element 1 itself; the passage of air is indicated by the arrows F through the openings 4 and the other parts of the support element 1.

The support element 1 can moreover comprise a containment cover 16, which can be made with the common materials used in making mattresses or similar supports for the human body, for example quilted fabrics, with fibre or foam padding, or other filling materials, three-dimensional fabrics, single fabrics, both synthetic and natural, the foam and the gel being made with polyurethane and being also able to contain products derived from processing natural materials.

One important characteristic of the containment cover 16 is that of not generating a masking effect of the elastic, supporting and adaptation capabilities of the underlying layer made from gel 2, another important characteristic is that of allowing the desired air circulation.

For these reasons the cover 16 is preferably thin at least in the area of the gel layer 2 and/or at the openings 4.

Concerning now the first layer 2 made from gel itself, it is associated with the second layer 3 and comprises a distribution of heads 5 in contact with parts of the body of the user defined between air circulation throats 6.

According to one version of the invention, the contact surface for the body of the user can be equal to or greater than 50%.

It should be noted that by suitably varying the geometry of the throats 6, the openings 4 and of other possible channels for ventilation, it is possible to adjust in the desired manner the ratio between the areas of the contact surface and of the surface intended for ventilation.

This is possible due to the fact that the yielding of the part in gel is not due to a particular geometrical shape, intended to deform and to become unstable so as to provide a certain yielding and absorb the load of the user, but only due to the intrinsic characteristics of the gel material.

More in detail the mentioned heads 5 comprise slits 7 that are suitable for allowing air to circulate between the heads 5 themselves and the parts of the body of the user resting on them.

The second layer 3 is made from foam, and the first layer 2 made from gel and the second layer 3 made from foam are associated so as to form a single plate.

FIGS. 1 and 2 illustrate two views of the first layer 2 and of the second layer 3 in which the air flow is schematically indicated with the arrows F through the openings 4.

In one version of the invention, the second layer 3 is made from polyurethane foam. In a further version of the invention, the second layer 3 is made from a foam that can be coupled with the material that forms the first layer 2 made from gel.

The support element 1 further comprises a film 20, which is made from non-stick material, which covers the free surface of the first layer 2 in gel associated with the second layer 3.

The film 20 perfectly follows the surface that it must cover, preventing the formation of faults, air bubbles and anything else that could jeopardise its quality.

As indicated above, the support element 1 (FIGS. 1 and 2) can be in the form of a simple plate comprising only the first layer 2 in gel associated with the second layer 3 made from foam, or it can also comprise a base 8 that is suitable for housing the first layer 2 in gel associated with the second layer 3, and having a predetermined height such as to achieve the optimal comfort for the user.

More in detail, according to what is illustrated in FIGS. 3-6, the mentioned base 8 can comprise a distribution of grooves 9 that are open on the side for coupling with the second foam layer 3, and a distribution of channels 10 that are open on the side opposite that for coupling with the second foam layer 3: the aforementioned grooves 9 intersect the openings 4 and the channels 10 so as to allow air to circulate in an optimal manner in the support element 1.

In another embodiment, the support element 1 can comprise a shim having a meshed structure 11 (FIG. 7) that can be the base itself or used as a layer arranged between the base 8 and the second foam layer 3 associated with the first gel layer 2, and in particular the shim with the meshed structure 11 is suitable for promoting the circulation of air. In such an embodiment the base 8 may also not comprise the aforementioned channels 10 and grooves 9.

The shim 11 can be made with a three-dimensional mesh fabric structure, for example the three-dimensional fabric marketed with the name "3mesh" by the company Mueller Textil Group, and/or with a meshed foam, for example polyurethane, and/or with a polyethylene or polyolefin plate, for example marketed with the name "C-Core" by the company Daewoo, as indicated in U.S. Pat. No. 7,625,629.

The shim 11 can also be made from a perforated foamed lattice, or foamed perforated EVA (ethylene vinyl acetate) or perforated polyurethane foam, and/or from so-called "pocket coils", i.e. coils that are individually arranged in bags or packets so as to avoid interfering with one another, and/or by "continuous coils", i.e., coils in which the rows of windings are formed by a single continuous metal wire element.

The shim 11 can moreover comprise blocks of fibre like coconut, natural and synthetic felt, and/or hydrophilic foam/fabrics/film, i.e. with high capability of absorbing the humidity generated by the user.

The base 8 can also define two side portions 8a, between which the first gel layer 2 associated with the second foam layer 3 are housed with the heads 5 substantially arranged flush with the sides 8a themselves.

The support element 1 can also comprise two end elements 12 that are located opposite one another between the sides 8a of the base 8 and laterally with respect to the first gel layer 2 associated with the second foam layer 3; such end elements 12 are arranged flush with the sides 8a of the base 8 and with the heads 5 of the first gel layer 2.

At least the first gel layer 2 and the second foam layer 3 are made in a single plate through a first and a second successive casting, so as to ensure the maximum hold of the reciprocal coupling.

Also the base 8 can be made from foam like the second layer 3, like for example from polyurethane foam, or from other types of different foams, such as for example latex foam, and/or "pocket coils," and/or coils with a continuous wire also called "bonnel inner spring" and/or "continuous coils."

The method for making the support element 1 according to the present invention comprises the steps of providing at least one mould 13 for casting the support element 1, providing the at least one mould 13 of at least one distribution of projections 14 having a first predetermined height, inserting or spraying, in contact with the at least one mould 13, a film 20 made from non-stick material with a releasing function, casting in the at least one mould 13 the gel so as to obtain a first gel layer 2 to a second predetermined height, the second predetermined height being substantially lower than the first predetermined height of the projections 14, casting in the mould 13 a material other than gel so as to obtain a second layer 3 over said first gel layer 2, obtaining a total height that is equal to or greater than said first predetermined height of said projections 14 of a second layer 3 for a total height that is equal to or greater than the first predetermined height of the projections 14, extracting from the at least one mould 13 the first gel layer 2 associated with the second layer 3 shaped in a single plate.

The method is moreover characterised in that it foresees to cut the plate so as to obtain openings 4 corresponding to the areas made with the projections 14 of the at least one mould 13, so as to obtain through openings 4 for air to circulate in said first gel layer 2 and in said second layer 3 associated in a single plate.

The second layer 3 can comprise an expanding material which is expanded in a further step.

This expansion step can occur so as to completely fill the at least one mould 13, when this is of the closed type, or it can be left to expand freely if the at least one mould 13 is of the open type.

In this case, the second layer will be finished off during the aforementioned cutting step.

The mould 13 can also comprise a distribution of reliefs 15 that are suitable for making, in the first gel layer 2, the heads 5 in contact with the parts of the body of the user defined between corresponding throats 6 for air to circulate, and the aforementioned projections 14 are located substantially at the intersections of the reliefs 15.

The mould 13 can moreover comprise a distribution of crests (not visible in the figures) that are suitable for making, on the heads 5, the corresponding slits 7 for the circulation of air between the heads 5 themselves and the parts of the body of the user resting on them.

In particular, the second layer 3 is cast in the mould 13 after the first gel layer 2.

In such a way, according to what has been indicated above, such first and second casting steps make it possible to associate the first gel layer 2 and the second layer 3 of expanding material other than gel, so as to ensure the maximum hold of the reciprocal coupling, as described in U.S. Pat. No. 7,576,137 to Technogel Gmbh & Co K, the text of which is included here as a reference.

The film 20 can be made from thermoformed polymer material, for example TPU of Epurex, and/or from silicone and/or wax; it can be a preformed film or made through coating, i.e. through spraying, of the mould 13, through at least one of the aforementioned materials.

The film 20 is preferably made from a material similar to the material forming the first gel layer 2 and the second foam layer 3. The film 20 acts as a material for releasing the mould 13.

Moreover, the film 20 has an important function of protecting the first gel layer 2, which would otherwise become damaged or torn with use.

The film 20 covers at least part of the side surface of the through holes 4—both in the part belonging to the first gel layer 2 and in the part belonging to the second foam layer 3—preserving their integrity over time, mainly but not exclusively in the part belonging to the first gel layer 2.

In this way the function of effective passage of air from one side to the other of the support element 1 is fully ensured.

The height of the first gel layer 2 can vary from one area to the next of the first layer 2 itself, according to the requirements of the manufacturer or of the user and as a function of the height of the respective projections 14.

The method for making the support element 1 further comprises the step of cutting the plate of the support element 1 according to a plane P that is substantially longitudinal passing through the second layer 3 and intersecting the seats that were previously made through the projections 14 of the mould 13.

In such a way through openings 4 are obtained for the circulation of air in the first gel layer 2 and in the second layer 3 associated in a single plate.

Figure 10:
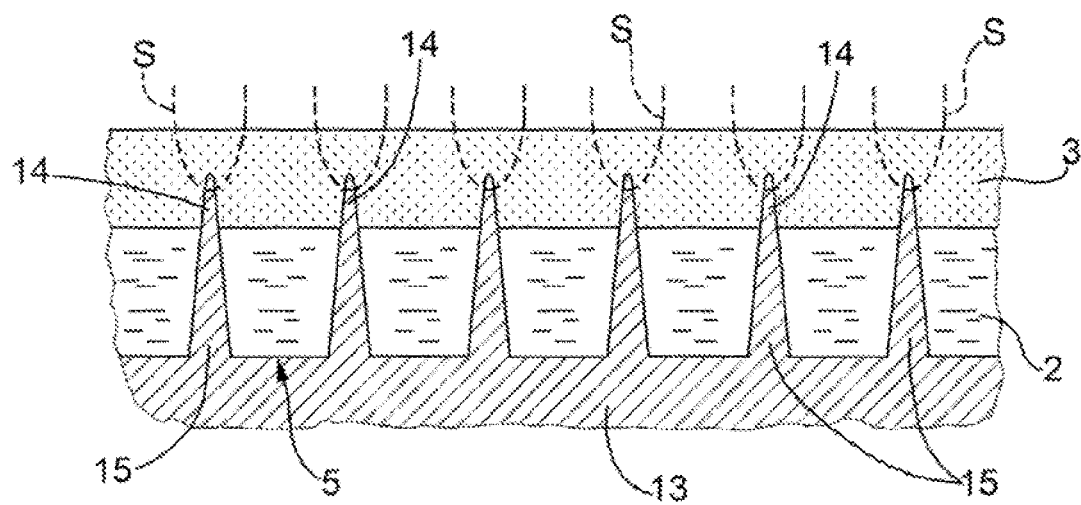
FIG. 10 is a schematic sectioned view of a mould and respective parts of the support element, according to a further version of the present invention.

According to another version of the present invention visible in an embodiment given as an example and not for limiting purposes in FIG. 10, the step of cutting the plate, occurs in the form of notches S which will cross the seats created by the projections 14 of the mould 13, so as to obtain the through openings 4 for the circulation of air in the first gel layer 2 and in the second layer 3 associated in a single plate.

Such a cutting step, which as indicated above does not occur according to a longitudinal plane but through notches S, can be made by means of pantograph machines for cutting the polyurethane foam.

The areas that are made previously by the projections 14 can be die cut, so as to obtain the through openings 4, through die cutting machines or any other equipment that is suitable for that purpose.

In this last case, the film 20 only partially covers the side surface of the through openings 4; it is indeed important for the first gel layer 2 to be completely encapsulated by the film 20, whereas there are not the same requirements for the second layer 3.

As mentioned, the first gel layer 2 and the second layer 3 can be coupled to a base 8 with a predefined height and provided with a distribution of grooves 9 and channels 10 for the circulation of air.

Alternatively, the first gel layer 2 and the second layer 3 can also be coupled with a base 8 with a predefined height with the interposition of a shim having a meshed structure 11 that is suitable for allowing air to circulate.

According to one version of the invention, the first gel layer 2 is made with polyurethane gel, preferably with a hardness of 0.5-100 kPa at 40%, according to the ISO standard 3386-1.

Other types of materials that can be used for making the first gel layer 2 are soft thermoplastic elastomers, abbreviated as TPEs, or gels obtained with non polyurethane polymers, or with thermoplastic elastomers with plasticizers, and other materials that are suitable for such a purpose.

In particular, the first layer 2 is made from a material with the mechanical characteristics that allow it to support and distribute the weight of the user, and the comfort of which is related to the capability of deformation in a three-dimensional manner after a force has been applied.

The operation of the support element 1, according to the invention is, according to what has been described, completely intuitive.

According to what has been illustrated in FIGS. 1 and 2, the support element 1 can comprise, as mentioned, even only the first gel layer 2 associated with the second foam layer 3 so as to obtain a single plate passed through by the openings 4, and in such a case it can be used for example to make a seat of a chair, of an armchair, the cover of a saddle for vehicles, or even an exercise mat and the like: in all cases the aforementioned openings 4, together with the throats 6 between the heads 5 and the slits 7 foreseen on them, make it possible for there to be an optimal circulation of air (see arrows F in FIGS. 1 and 2) from one side to the other of the support element 1, ensuring the correct transpiration of the parts of the body of the user positioned in contact with the parts of the support element 1.

The same occurs in the case in which the support element 1 is for example a mattress, namely, as described previously, comprising a suitable base 8 that is coupled with the first gel layer 2 associated with the second foam layer 3 in a single plate.

Figure 5:
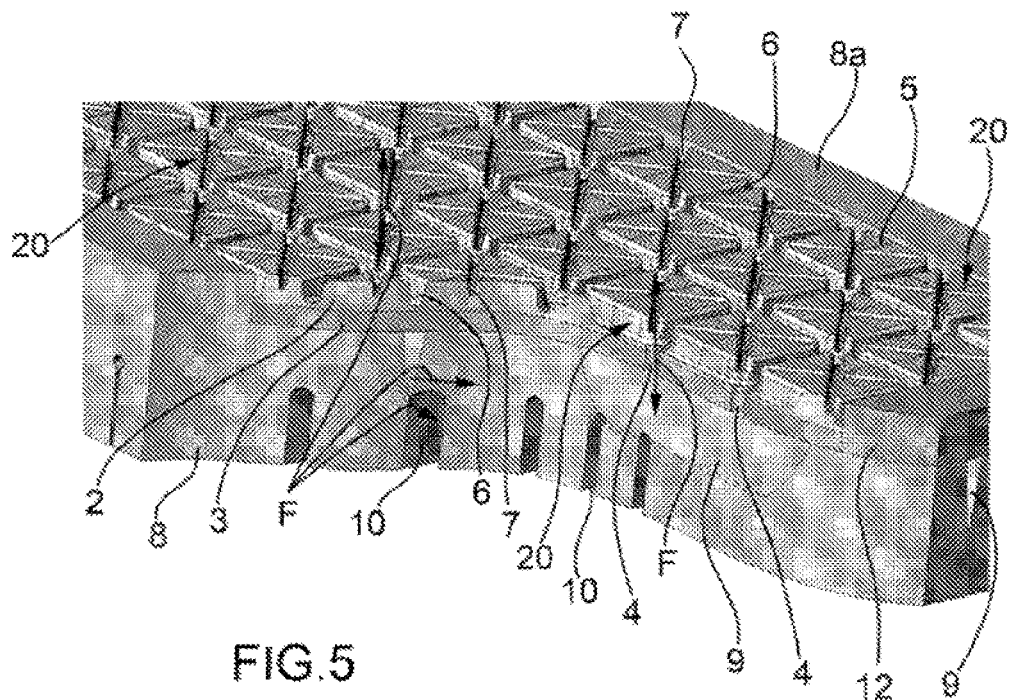
FIG. 5 is a partially split perspective view of a detail of the support element, according to the version of the previous FIGS. 3 and 4.
Figure 6:
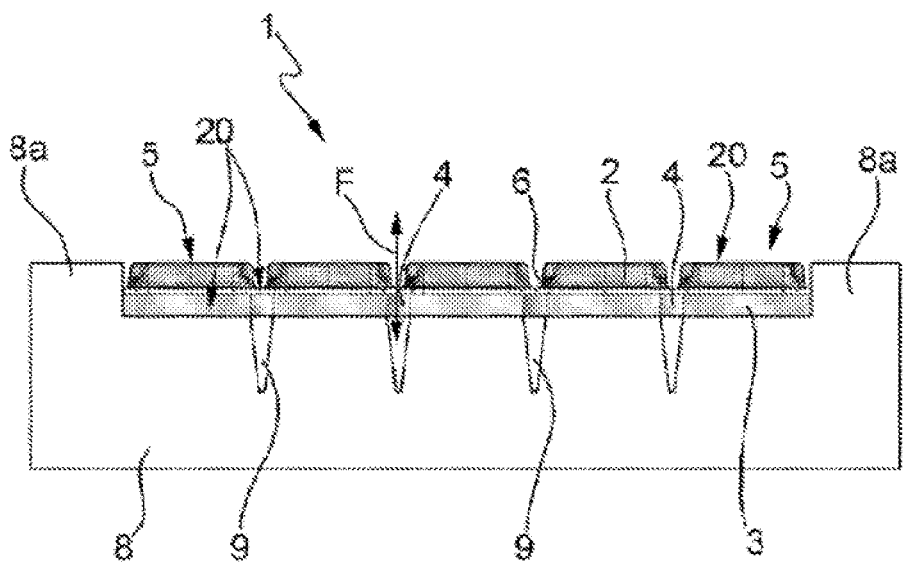
FIG. 6 is a cross section view of the support element inserted in a mattress, according to one version of the present invention.
Figure 7:
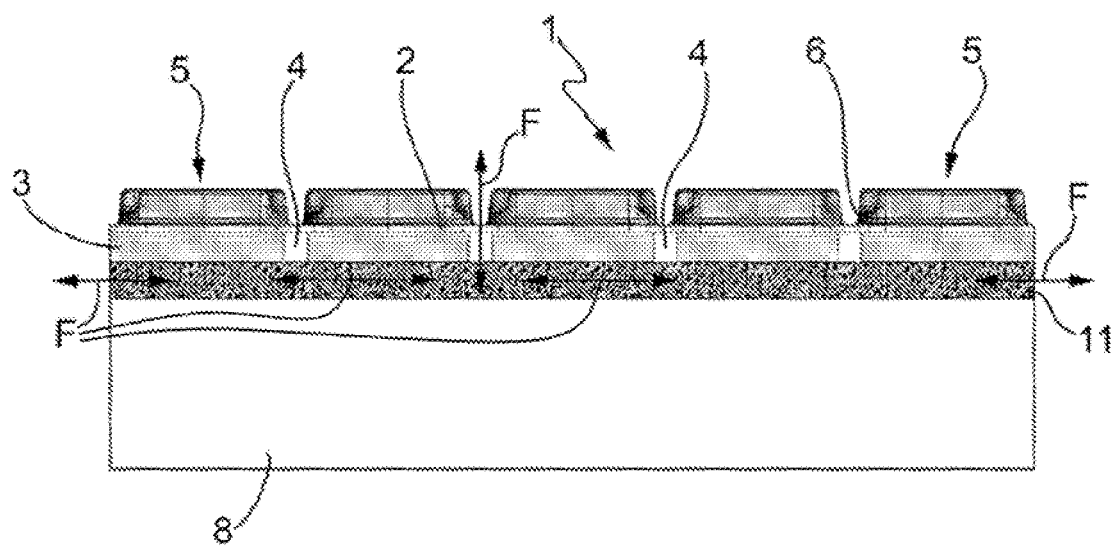
FIG. 7 is a cross-section view of another embodiment of the support element inserted in a mattress, according to another version of the present invention.
Figure 8:
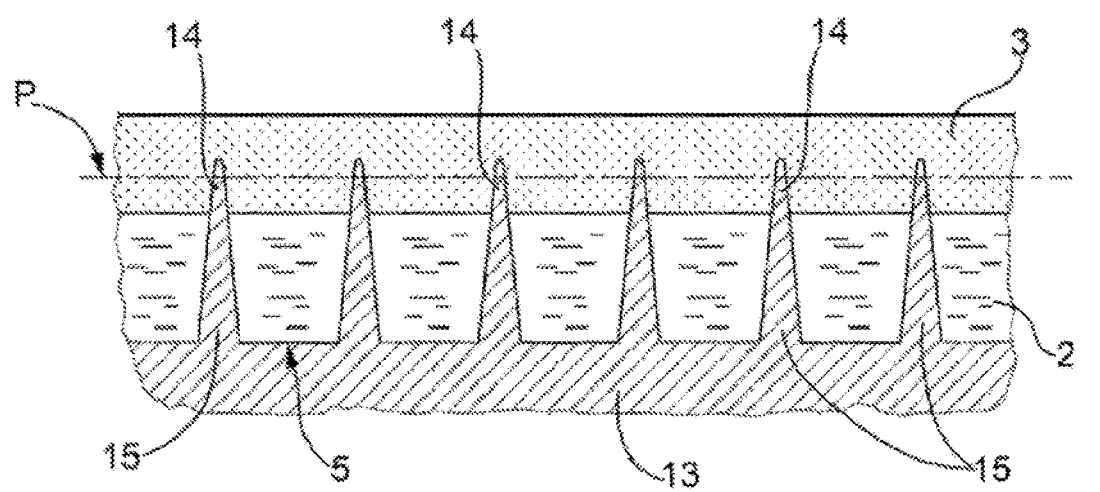
FIG. 8 is a schematic sectioned view of a mould and respective parts of the support element, according to one version of the present invention.

Also in this case the foreseen openings 4, throats 6 and slits 7, together with the grooves 9 and the channels 10 of the base 8, as illustrated for example in FIGS. 5 and 6 in which the circulation of air is indicated by the arrows F, or thanks to the interposition of the shim with a meshed structure 11, as illustrated for example in FIG. 7 in which the circulation of air is indicated by the arrows F, allowing there to be the suitable passage of air, promoting the comfort of the user.

Figure 9:
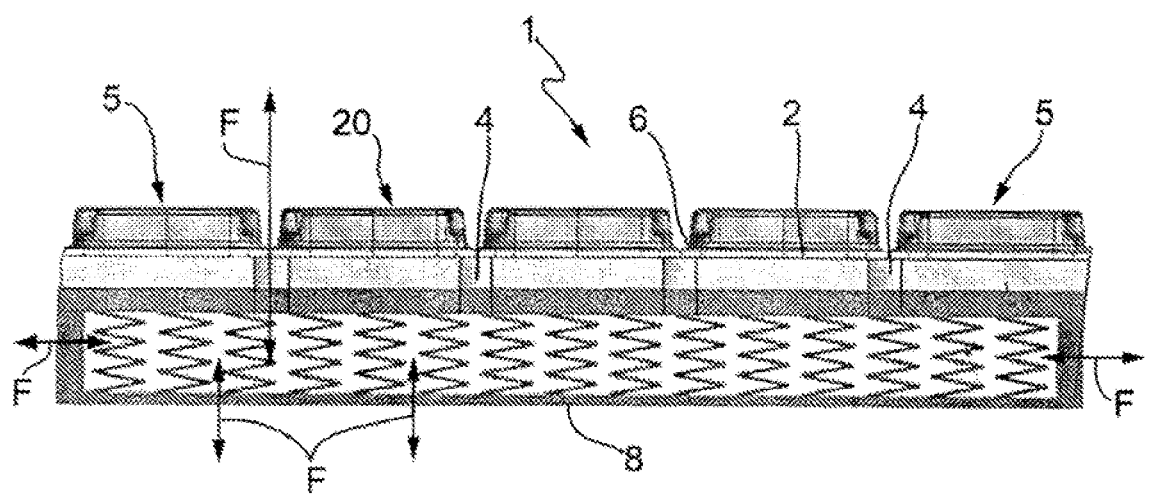
FIG. 9 is a cross-section view of the support element inserted in a mattress, according to a further version of the present invention.

Moreover, in the case illustrated in FIG. 9, the circulation of air indicated by the arrows F occurs through the base 8 itself due to the fact that, since it is of the coil type, it already allows an effective transpiration without requiring further channeling.

The invention thus conceived makes it possible to obtain important technical advantages.

One important technical advantage is made up of the fact that the support element 1 makes it possible, as seen, for there to be the optimal circulation of air inside it, ensuring in such a manner that there is the suitable transpiration and thermal regulation of the parts of the body resting on it, all this while keeping characteristics of elasticity, support, pressure distribution, adaptability and three-dimensional relationship between the user and the support element, thus eliminating the faults due to the high heat capacity of the gel that is now reduced having coatings with insulating characteristics, for example quilting, but which preclude the complete comfort provided by the gel layer.

Moreover, the method devised for making the support element makes it possible, as described, to obtain the desired circulation of air through the first gel layer 2 and through the second foam layer 3, effectively associated with successive casting in a single plate, obtaining directly, through the mould 13, the aforementioned openings 4 as well as the throats 6 and the slits 7.

The support element thus obtained has suitable mechanical elasticity, support and strength characteristics: indeed making the openings 4 at a later moment, through direct perforation of the uniform plate (without the presence of recesses determined by the projections of the mould) of the first gel layer 2 and of the second associated foam layer 3, would lead to a tearing of the same first gel layer 2 triggering the breaking of the entire support element.

It is possible to understand how the method described makes it possible to obtain the support element 1 with a low number of simple and effective operations, which—in addition to obtaining the described high elastic, support and three-dimensional adaptability characteristics together with the optimal circulation of air—make it possible to cut down time and relative production costs.

It has thus been seen how the invention achieves the proposed purposes.

The present invention has been described according to preferred embodiments, but equivalent variants can be conceived without for this reason departing from the scope of protection offered by the following claims.

The invention claimed is:

1. A method for making a support element for people comprising the steps of:
    providing at least one mold for casting said support element;
    providing said at least one mold with a distribution of projections having a first predetermined height;
    inserting or spraying a film, made of non-stick material having a detaching function, in contact with said at least one mold;
    casting in said at least one mold gel up to a second predetermined height, so as to make a first layer made of gel, said second predetermined height being substantially lower than said first predetermined height of said projections;
    casting in said at least one mold a material different from the gel so as to make a second layer overlapping said first layer made of gel, thus obtaining a total height equivalent or higher than said first predetermined height of said projections, wherein said second layer comprises expanding material and comprises an expansion step of said expanding material of the second layer.

2. The method of claim 1, further comprising the step of cutting to obtain openings corresponding to areas delimited by the projections of said at least one mold, so as to obtain through openings for air circulation, from one side to the other of the support element, in said first layer made of gel and in said second layer associated in a single plate.

3. The method according to claim 1, comprising extracting from said at least one mold said first layer made of gel associated to said second layer shaped in a single plate.

4. The method according to claim 2, wherein said step of cutting is carried out according to a plane (P) substantially longitudinal passing through said second layer and intersecting seats previously made through the projections of the at least one mold.

5. The method according to claim 2, wherein said step of cutting the plate is carried out making some notches (S) which will cross seats made by the projections of the at least one mold, thus obtaining the through openings.

6. The method, according to claim 2, wherein said through openings are provided by die-cutting.

* * * * *